United States Patent
Larsen et al.

[11] Patent Number: 6,026,161
[45] Date of Patent: Feb. 15, 2000

[54] CALL REJECTION

[75] Inventors: Flemming Klovborg Larsen, Copenhagen; Peter IB, Herlev, both of Denmark; Christian Lindholm, Helsinki, Finland

[73] Assignee: Nokia Mobile Phones Limited, Espoo, Finland

[21] Appl. No.: 08/975,518

[22] Filed: Nov. 20, 1997

[30] Foreign Application Priority Data

Nov. 22, 1996 [GB] United Kingdom .................. 9624520
Feb. 21, 1997 [GB] United Kingdom .................. 9703642

[51] Int. Cl.[7] .............................. H04M 1/00; H04M 9/00
[52] U.S. Cl. ........................... 379/433; 379/428; 455/90; 455/566
[58] Field of Search .................................... 379/420, 432, 379/428, 433, 429, 423, 456, 142, 415, 95, 430; 455/90, 575, 556, 550, 564, 566, 414, 567

[56] References Cited

U.S. PATENT DOCUMENTS

| 4,117,542 | 9/1978 | Klausner et al. ........................ 364/900 |
| 5,436,954 | 7/1995 | Nishiyama et al. ..................... 379/433 |
| 5,633,912 | 5/1997 | Tsoi ........................................ 379/433 |
| 5,677,949 | 10/1997 | Macor ..................................... 379/433 |
| 5,841,849 | 11/1998 | Macor ..................................... 379/433 |
| 5,852,783 | 12/1998 | Tabe et al. .............................. 455/566 |
| 5,884,185 | 3/1999 | Kim ......................................... 379/433 |
| 5,898,774 | 4/1999 | Shindo .................................... 379/433 |
| 5,901,222 | 5/1999 | Macor ..................................... 379/428 |
| 5,903,852 | 5/1999 | Schaupp et al. ........................ 455/564 |
| 5,930,352 | 7/1999 | Hiraiwa ................................... 379/428 |
| 5,943,625 | 8/1999 | Yeom et al. .............................. 455/90 |
| 5,956,655 | 9/1999 | Suzuki et al. .......................... 455/566 |

FOREIGN PATENT DOCUMENTS

| 0 633 684 A2 | 1/1995 | European Pat. Off. . |
| 0 679 003 A2 | 10/1995 | European Pat. Off. . |
| 0 726 657 A1 | 8/1996 | European Pat. Off. . |
| WO 95/25397 | 9/1995 | WIPO . |
| WO 96/08937 | 3/1996 | WIPO . |

*Primary Examiner*—Curtis A. Kuntz
*Assistant Examiner*—Rexford N. Barnie
*Attorney, Agent, or Firm*—Perman & Green, LLP

[57] ABSTRACT

A phone is provided with a set of keys and a controller which monitors the status of the phone. The set of keys comprises a call handling key for establishing and terminating a call. The functionality of the call handling key is controlled by the controller in dependence on the status of the phone, and said set of keys comprises a key for rejecting an incoming call.

4 Claims, 4 Drawing Sheets

CALL REJECTION

BACKGROUND OF THE INVENTION

The invention relates to a phone with a user interface including a keypad comprising keys for call handling.

The phones sold by the applicants as model Nokia 2110 and Nokia 8110 are exponents of the presently dominating user interface style based on two call handling keys. One of the keys is dedicated to call establishment, that is e.g. establishing a call based on a phone number displayed in the display, and answering an incoming call. The other key is dedicated to termination of an ongoing call and to rejection of an incoming call. This has been a standard for several years. However, the users ask for a more well-arranged and more manageable keypad.

SUMMARY OF THE INVENTION

In accordance with the invention there is provided a phone with a set of keys and a controller which monitors the status of the phone, said set of keys comprising a call handling key for establishing and terminating a call, the functionality of the call handling key being controlled by the controller in dependence on the status of the phone, said set of keys comprising a key for rejecting an incoming call.

Hereby both call establisment and call termination can be integrated in a single key in a logical way for the user. Most of the time the user is to handle a call, he may depress the call handling key. If he wants to reject an incoming call, he is just to depress a call rejection key. This call rejection key may preferably be the "clear" key of the phone. This will be easy to remember for the user because he will just have to "clear" the call.

The invention provides a set of call handling keys arranged in a more manageable way.

Advantageously, the phone transmits a busy signal to the network. In the GSM network this busy signal may be the "User Determined User Busy" signal described in ETS 300 500 (GSM 02.01, Annex C.3). Hereby the user may manually divert an incoming call to a preset phone number, e.g. to a voice mail box or to another person in his department.

The invention furthermore relates to a phone with a set of keys, alerting means and a controller which monitors the network activity and controls the activity of the phone in dependence thereon, said set of keys comprising keys for call handling, including a key for rejecting an incoming call, and when said controller detects an incoming call, it activates said alerting means and transmits a "user busy" signal upon detection of an activation of the call rejection signal. Hereby an incoming call may be handled in the same way as if the network detects that the user is busy with an ongoing call. This call forwarding is described in ETS 300 543 (GSM 03.82, part 2).

BRIEF DESCRIPTION OF THE DRAWINGS

The invention will be explained more fully below in connection with a preferred embodiment and with reference to the drawing, in which.

DETAILED DESCRIPTION OF THE INVENTION

Figure 1:
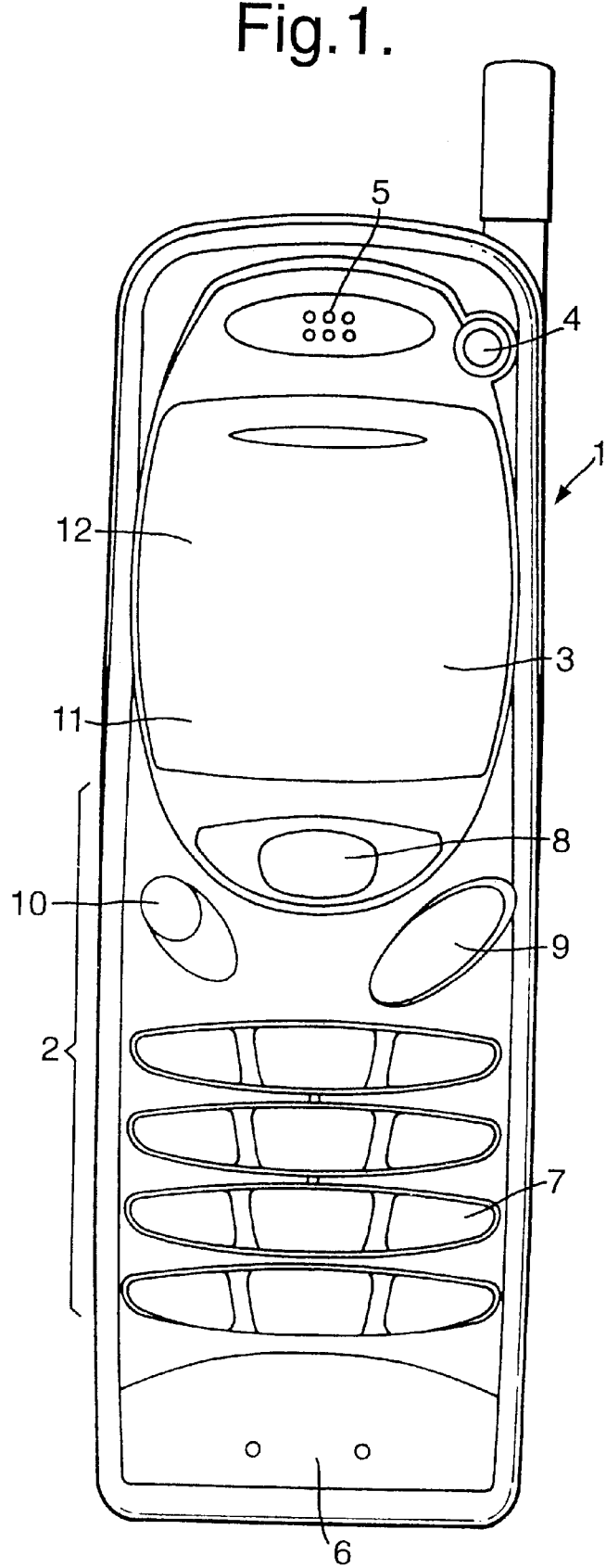
FIG. 1 shows a preferred embodiment of a portable phone having a user interface according to the invention.

FIG. 1 shows a preferred embodiment of a radiophone according to the invention, and it will be seen that the phone, which is generally designed by 1, comprises a user interface having a keypad 2, a display 3, an on/off button 4, an earpiece 5, and a microphone 6. The keypad 2 has a first group 7 of keys in the form of alphanumeric keys by means of which the user can enter a phone number, write a text message (SMS), write a name (associated with the phone number), etc. The user uses the first group of keys primarily for entering data in the phone (entry events).

The keypad 2 additionally comprises a second group of keys which, in the preferred embodiment, comprises precisely one multi-functionality key 8 or soft key whose function depends on the present state of the phone. The default function or the present function of the multi-functionality key 8 is displayed in a selected area 11 of the display 3. In the preferred embodiment, the second group of keys additionally comprises a scroll key 9 by means of which the user can jump selectively from one item to the preceding or the succeeding item in the menu loop of the phone, while he gets access to a submenu loop under the item concerned in the main menu loop by activation of the multi-functionality key. The clear key 10 may be used e.g. for erasing the digit or letter entered last by brief depression, while depression of a longer duration will erase the entire number or word. Like the multi-functionality key 8, the scroll key 9 and the clear key 10 may advantageously be redefined in some states, which appears from the following.

Figure 3:
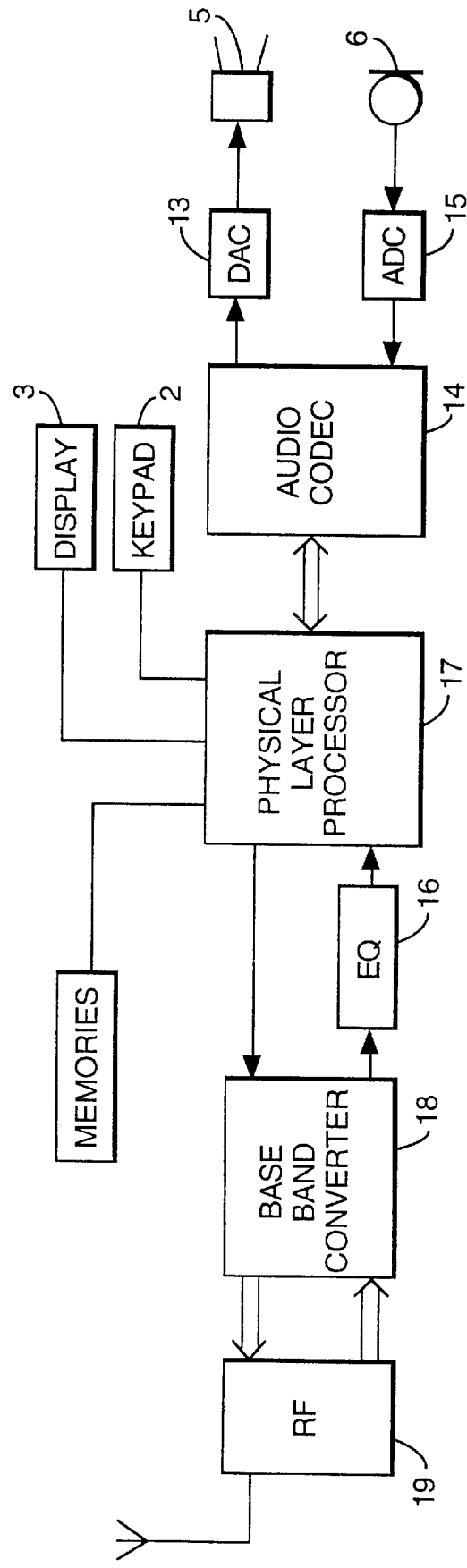
FIG. 3 schematically shows the hardware parts of a portable phone which are essential to the understanding of the invention.

FIG. 3 schematically shows the most important parts of a preferred embodiment of a portable phone. The preferred embodiment of the phone of the invention is adapted for use in connection with the GSM network, but, of course, the invention may also be applied in connection with other phone networks, such as cellular networks and various forms of cordless phone systems. The microphone 6 records the user's speech, and the analog signals formed thereby are A/D converted in an A/D converter 15 before the speech is encoded in an audio codec unit 14. The encoded speech signal is transferred to a physical layer processor 17, which i.a. supports the GSM terminal software. The processor 17 also forms the interface to the peripheral units of the apparatus, including the memories (RAM, ROM), the display 3 and the keypad 2 (as well as SIM, data, power supply, etc.). The processor 17 communicates with the RF part 19 via a baseband converter 18 and a channel equalizer 16. The audio codec unit 14 speech-decodes the signal, which is transferred from the processor 17 to the earpiece 5 via a D/A converter 13. The units 13–18 are usually integrated in a chip set, an example of such a commercially available chip set being AD20msp410 GSM from Analog Devices with associated protocol software from The Technology Partnership (TTP).

Figure 2:
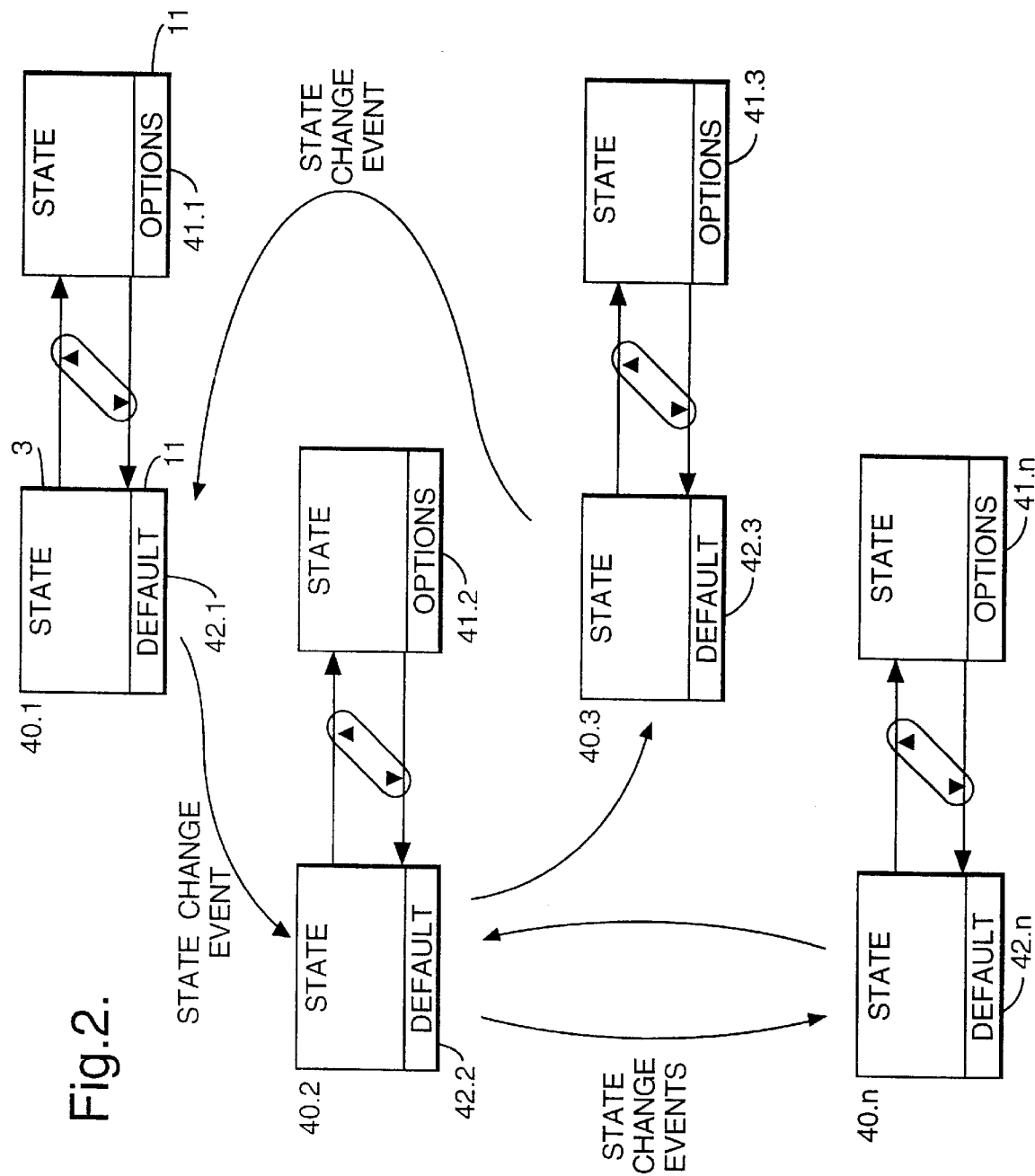
FIG. 2 shows switching between the states of the phone.

The processor 17, which serves as the controller unit in a manner known per se in the preferred embodiment, is connected to the user interface. Thus, it is the processor which monitors the activity in the phone and controls the display 3, 11 in response thereto. Therefore, it is the processor 17 which detects the occurrence of a state change event and changes the state of the phone and thus the display text. A state change event may be caused by the user when he activates the keypad, which is called an entry event, and also by the network connection of the phone or by another event beyond the user's control, which is called a non user event. Non user events comprise status change during call set-up, change in battery voltage, change in antenna conditions, message on reception of SMS, etc. The phone can assume a plurality of predetermined states 40.1–40.n, which is illustrated in FIG. 2. A plurality of actions (options 41.1–41.n) may be performed in these states 40.1–40.n. The display image on arrival at state 40.1 may be a phone number or the name of a person contained in the phone book of the phone, which is indicated by "state". "State" might also cover "incoming calls", "E-mail received", "SMS received", etc. If the display contains a phone number, the default function 42.1–42.n might be "call". The scroll key 9 allows switching from the default function to the group of possible functions to which the default function belongs. It is noted that, in the preferred embodiment, the scroll key 9 toggles between the default function and the group of possible functions (options), but switches between items in the group of possible functions once this group has been selected by means of the multi-functionality key. The state is maintained during toggling and scrolling through the options.

As will be seen from FIG. 2, a state change event will result in a change from one state to another. The new state depends on the old state and the nature of the state change event. During an established call ("call established" state), the default function of the multi-functionality key 8 will be "end".according to the preferred embodiment. If a new incoming call "is waiting", the user may use the scroll key 9 to produce the option list including items such as "end", "join", "answer" and "swap" without interrupting the call.

Each state 40.1–40.n is associated with a predefined group of functions, actions or options 41.1–41.n, which are possible precisely for that state. Establishment of conference calls, e.g., can be performed only when a call has already been established. A preferred function serving as the default function 42.1–42.n is designated in each of these groups. This designation may be performed by the programmer during programming, by the user through his redefinition of the default function, or by the phone itself in that it records the frequency of the use of the individual functions and appoints the most frequently used one in each group as the default function—optionally with the user's acceptance.

When the phone changes its state, the multi-functionality key can perform the default function if it is activated, and the user may toggle between the default function and the whole group of options by means of the scroll key. If the group of options is selected with the multi-functionality key, the user will be able to scroll through the group of options with the scroll key and to select the desired (designated) function with the multi-functionality key.

When a function is selected with the multi-functionality key, the processor 17 runs the associated program sequence to execute the function.

Figure 4:
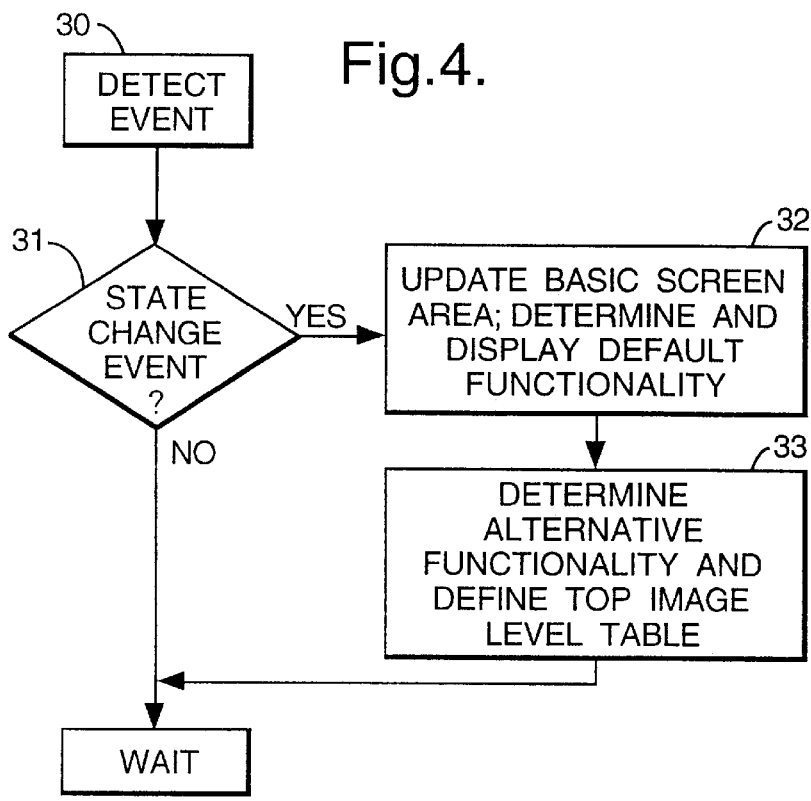
FIG. 4 shows a flow diagram illustrating the call handling in a phone according to a preferred embodiment of the invention.

FIG. 4 shows a flow diagram for the control of the functionality of the call handling key integrated in the multi-functionality key 8 and the call rejection key integrated in the clear key 10 according to a preferred embodiment of the invention. The CPU 17 monitors the activity of the phone. When an event (an entry event initiated by the user, a network event (e.g. an incoming call) or an event detected in the phone (e.g. battery voltage low)) occurs, this will be detected in step 30. The CPU checks the type of the event, and if it is detected in step 31 that the event is a state change event, the set of functionalities is determined and the default functionality is identified in step 32. Both the basic screen area 12 and the separate field 11 are updated accordingly. At the same time the CPU 17 determines whether the functionality of the "clear" key has to be redefined or not.

In step 33 the group of alternative functionalities is determined and the full top image level is defined. When this has been done the phone starts waiting for the next event.

When the user enters a phone number in idle mode in step 30, the first digit will change the state, while the other digits will just update the basic screen area 12, and the CPU 17 waits for the next event.

Figure 5:
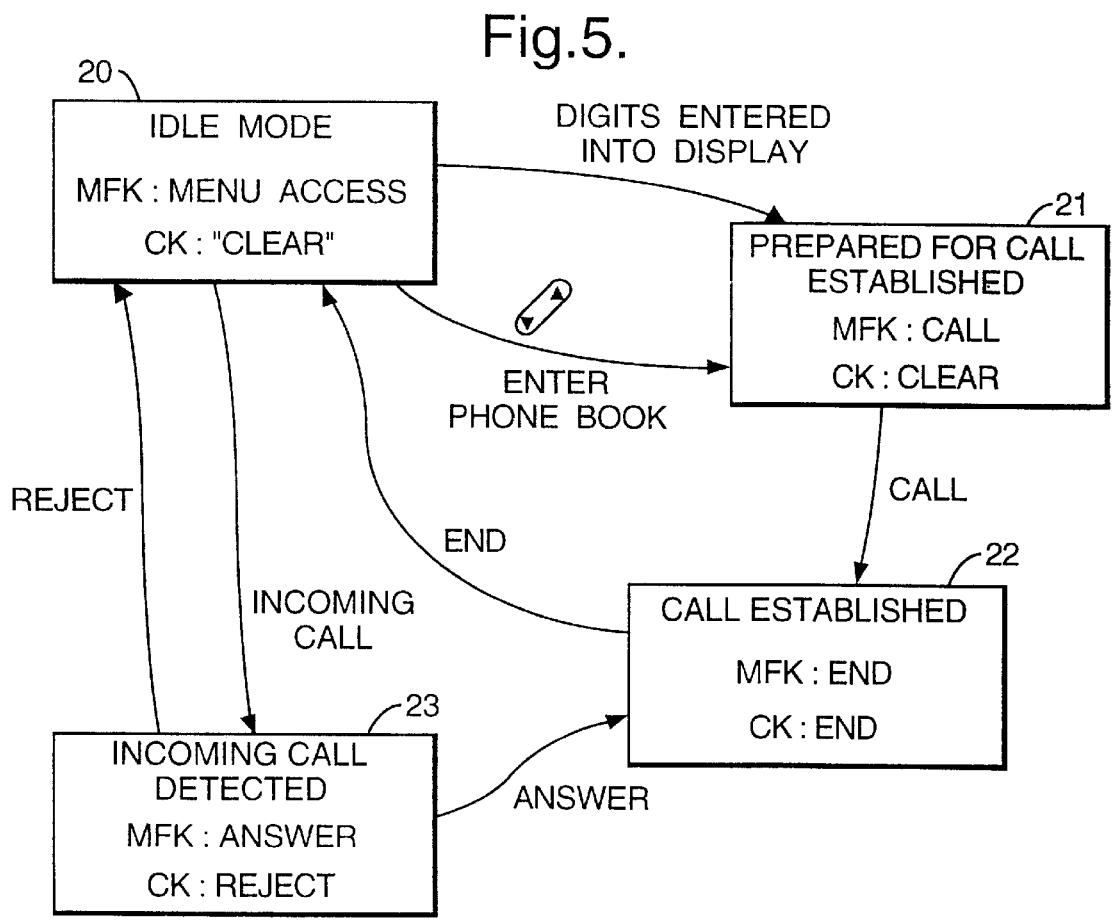
FIG. 5 shows a diagram for call handling related states of the phone according to a preferred embodiment of the invention.

FIG. 5 shows a diagram for call handling related states of the phone and the corresponding functionalities of the call handling key (the multi-functionality key 8) and the clear key 10.

When the phone is in "idle mode" 20, the CPU 17 mainly monitors the network. In "idle mode", the functionality of the multi-functionality key 8 provide access to the main menu of the phone. The "c" key 10 has no functionality because there are no digits to clear. The CPU 17 recognizes (in step 31; FIG. 4) entering of digits into the display 3 as a state change event. The digits are entered into the display via the alphanumeric keys 7.

The entering of the first digit causes the phone to enter a "prepared for call establishment" mode/state 21. This state will be maintained as long as the digits are present in the display. In "prepared for call establishment" state/mode, the functionality of the multi-functionality key 8 and the "c" key 10 is establishment of a call based on the phone number in the display and clearing the last entered digit, respectively. The CPU 17 looks for the next event (in step 30; FIG. 4). If this event is activation of the multi-functionality key 8, the phone enters a "call established" state/mode 22.

In the "call established" state/mode 22, the functionality of the multi-functionality key 8 and the "c" key 10 is termination of the call. The CPU 17 looks (in step 30; FIG. 4) for an activation of one of these keys. By activating the scroll key 9 it will be possible to enter the menu structure to establish a conference call. When the call is terminated by activating the multi-functionality key 8 or the "c" key 10, the phone returns to "idle mode" 20.

Instead of entering the "prepared for call establishment" mode/state 21 by entering digits, the mode/state could be entered by depressing the scroll key 9 in "idle mode". The phone is the first item in the menu, and a single depression of the scroll key 9 would have displayed the name/number stored in the phone book. The names will be displayed in alphabetic order. The other names could be displayed by depressing the scroll key 9 or by depressing an alphanumeric key—the key "5/jkl" would display the first name under the letter "j". The functionalitity of the call handling keys is as described above.

The CPU detects an incoming call in idle mode, and then an alert is given as a beep, ringing or a visual indication (silent mode). The phone enters an "incoming call detected" mode/state 23. The functionality of the multi-functionality key 8 and the "c" key 10 is answering the call and rejecting the call, respectively. If the multi-functionality key 8 is activated, the call is answered and the phone enters the "call established" mode/state 22 described above. If the "c" key 10 is activated, the phone will transmit a busy signal to the network. According to the preferred embodiment of the invention, the busy signal is a "User Determined User Busy" signal as described in ETS 300 500 (GSM 02.01, Annex C.3). Hereby the user may manually divert an incoming call to a preset phone number, e.g. to a voice mail box or to another person in his department. This requires that the user of the phones has requested a "Call forwarding on mobile subscriber busy" service from the operator in advance. This service is defined in ETS 300 543 (GSM 03.82, part 2). If this service has not been requested, the call will be rejected as if the phone was a part of an ongoing call. The caller will not be able to realize the manually controlled business of the phone.

This feature is of interest due to the fact that the number of the calling party is normally transferred to the called phone when the call is handled by digital telephone exchanges. If the number is stored in the phone book, the corresponding name will be displayed, and the user may divert the call if he does not want to answer, for example if he expects an important call.

Although it has been shown in the preferred embodiment that the functions of the phone might very well be controlled by a single multi-functionality key including the call handling key, it may be found expedient in some cases to use separate keys for call handling and for menu access.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A portable phone with a set of keys and a controller which monitors the status of the phone, said set of keys comprising a call handling key for establishing and terminating a call, the functionality of the call handling key being controlled by the controller in dependence on the status of the phone, a key for rejecting an incoming call, said controller, when detecting the activation of the call rejection key, causing the phone to transfer the rejection signal to the network without disconnecting the network connection.

2. A portable phone according to claim 1 wherein said rejection signal is a "User Determined User Busy" signal to the network.

3. A portable phone according to claim 2 wherein the call rejection key is integrated in a "clear" key, and wherein the call rejection functionality is available only when the controller detects an incoming call.

4. A portable phone according to claim 1 wherein the call handling key is integrated in a multi-functionality key, and wherein the present functionality of the multi-functionality key is controlled by the controller in dependence on the status of the phone and displayed in a separate field of a display.

* * * * *